United States Patent [19]

Rosenthal

[11] Patent Number: 4,872,363
[45] Date of Patent: Oct. 10, 1989

[54] ELECTRIC POSITIONING APPARATUS

[76] Inventor: Doy Rosenthal, Rishon Le Zion St. 23, Netanya, Israel, 42275

[21] Appl. No.: 4,098

[22] Filed: Jan. 16, 1987

[30] Foreign Application Priority Data

Jan. 20, 1986 [IL] Israel .................................. 77654

[51] Int. Cl.$^4$ .................... G05G 11/00; B25J 17/00
[52] U.S. Cl. ...................................... 74/479; 901/23; 901/28; 248/653; 74/424.8 R
[58] Field of Search ............... 248/396, 652, 653, 654; 901/29, 28, 23; 74/479

[56] References Cited

U.S. PATENT DOCUMENTS

| 3,215,391 | 11/1965 | Storm | 248/396 |
| 3,288,421 | 11/1966 | Peterson | 248/396 |
| 3,295,224 | 1/1967 | Cappel | 248/396 |
| 3,529,354 | 9/1970 | Roberts et al. | 248/396 |
| 3,577,659 | 5/1971 | Kail | 248/396 |
| 3,779,400 | 12/1973 | Brockman et al. | 214/1 BB |

FOREIGN PATENT DOCUMENTS

| 52-20557 | 2/1977 | Japan | 901/28 |
| 54-55957 | 5/1979 | Japan | 901/28 |
| 2085399 | 4/1982 | United Kingdom . | |
| 2110427A | 6/1983 | United Kingdom | 901/29 |
| 2115778 | 9/1983 | United Kingdom . | |

Primary Examiner—Leslie A. Braun
Assistant Examiner—Janice E. Chartoff
Attorney, Agent, or Firm—Cushman, Darby & Cushman

[57] ABSTRACT

A three-dimensional positioning apparatus comprising a base (180), a first element (182) and a second element (186) is constructed in the form of a sawhorse bracket. The first element (180) is pivotable about a first pivot axis (184) only, and the second element (186) is pivotable about two axes, one substantially parallel to and one substantially perpendicular to the first pivot axis (184). The first element is positioned by a first axially elongatable cylinder (188), lying at an angle to a first plane extending through the first element and through the first pivot axis. The second element is positioned by a pair of second axially elongatable cylinders (194), arranged in a plane generally parallel to the first plane, and angled with respect to each other and converging towards each other from the base to the second element.

2 Claims, 16 Drawing Sheets

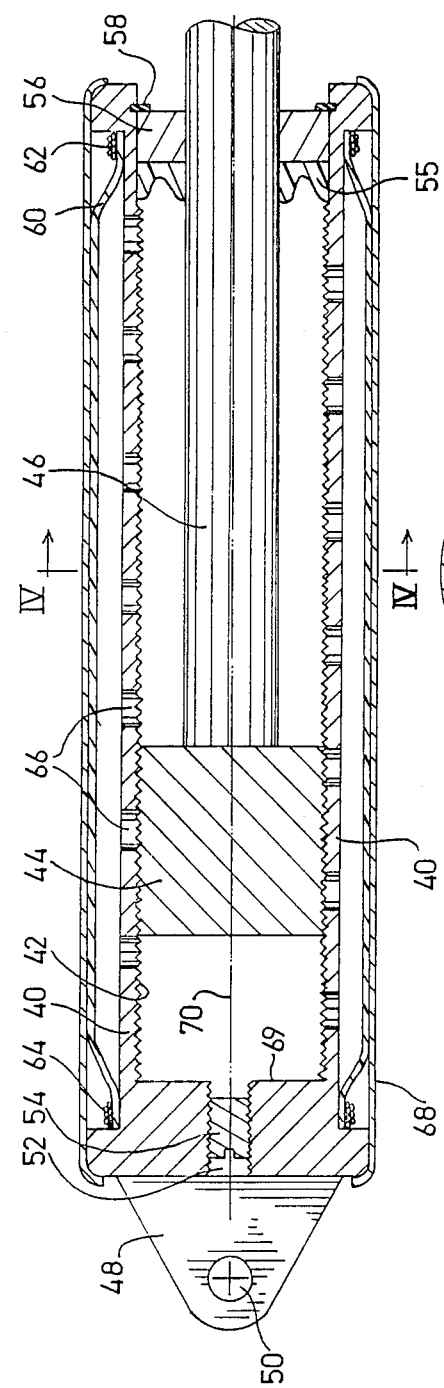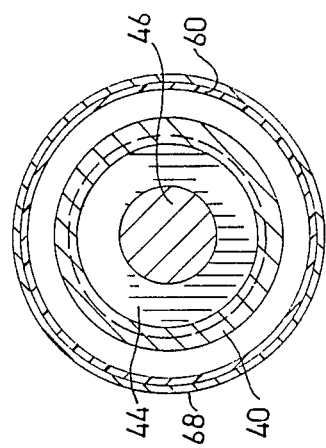
FIG 3
FIG 4

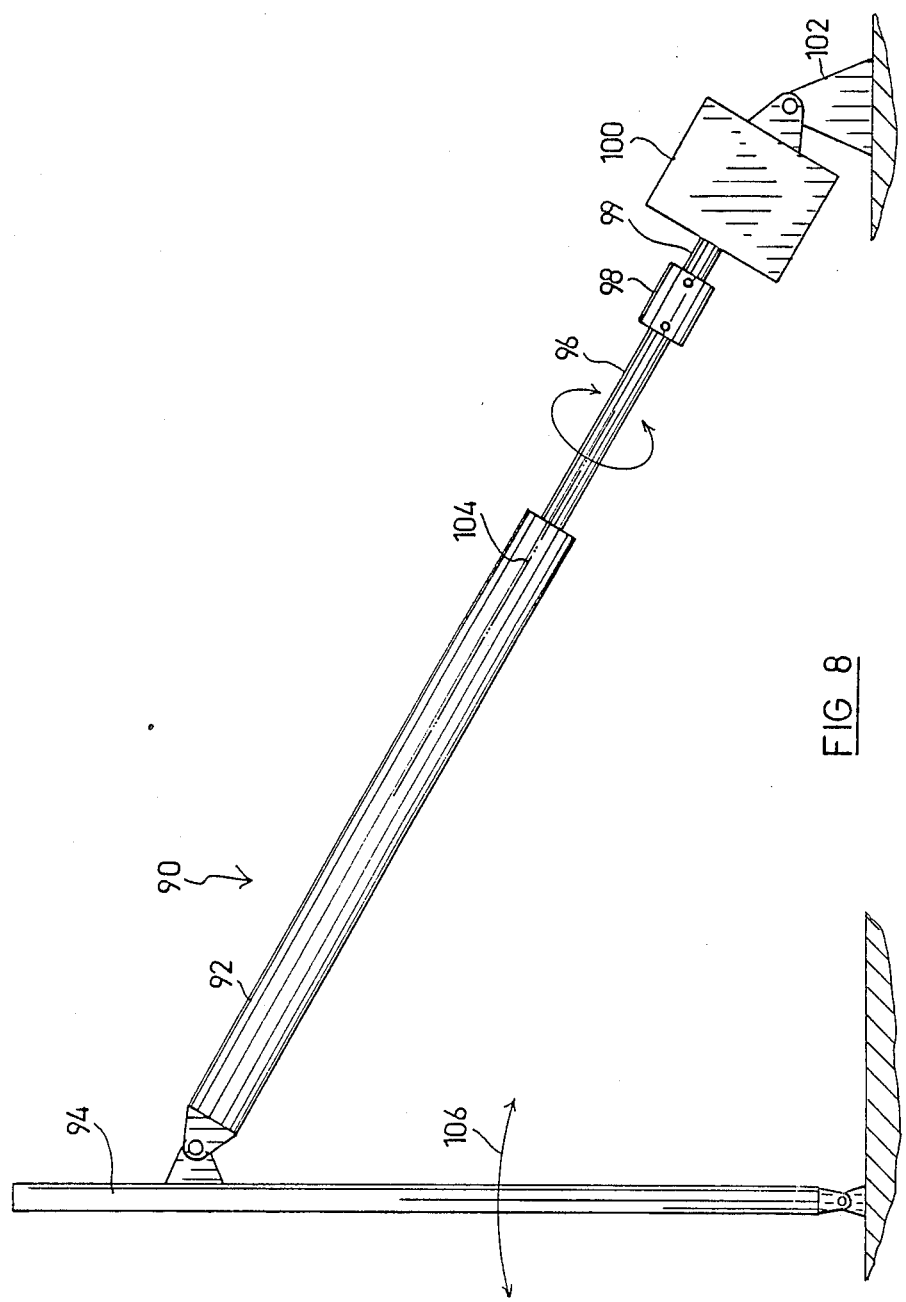

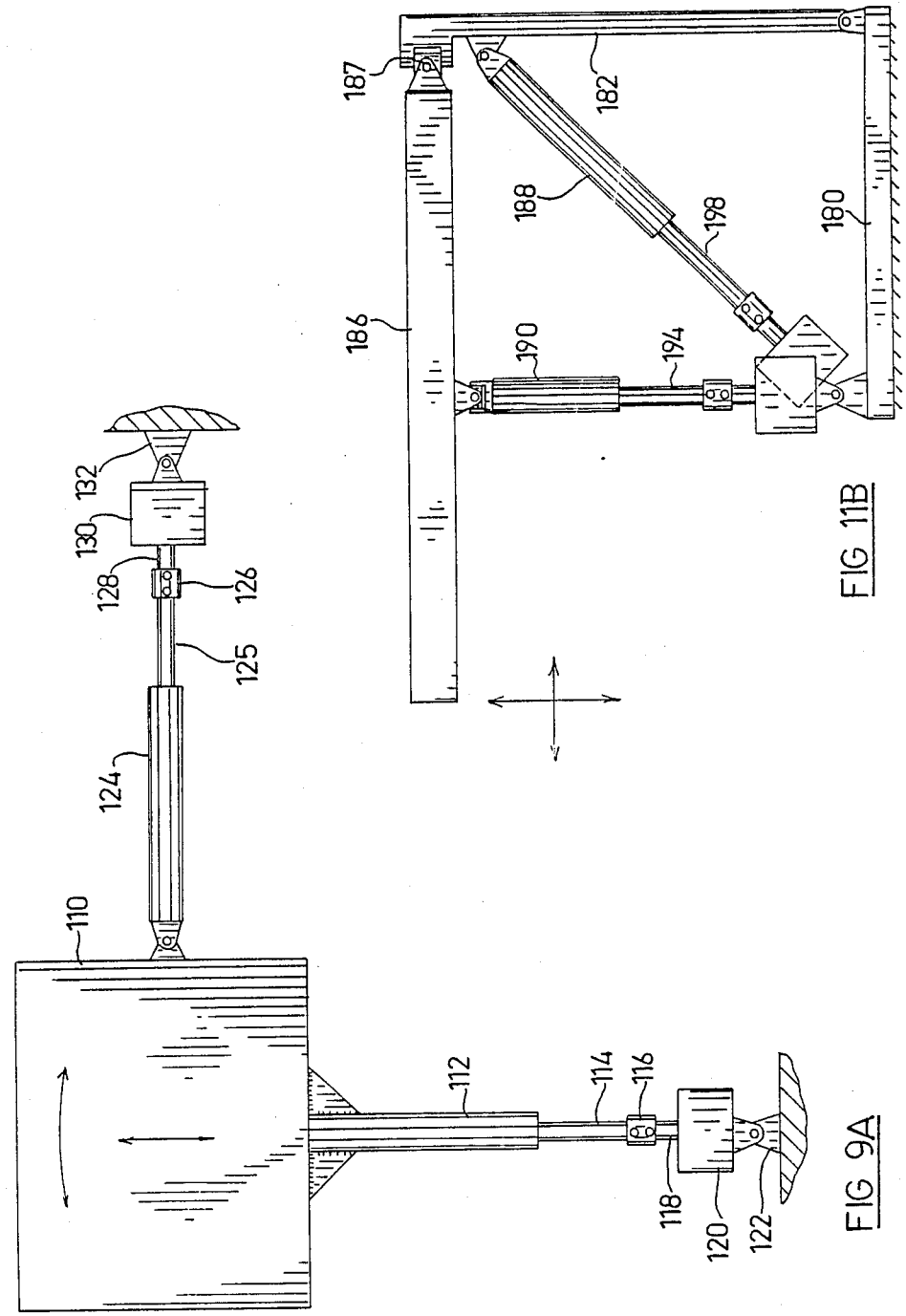

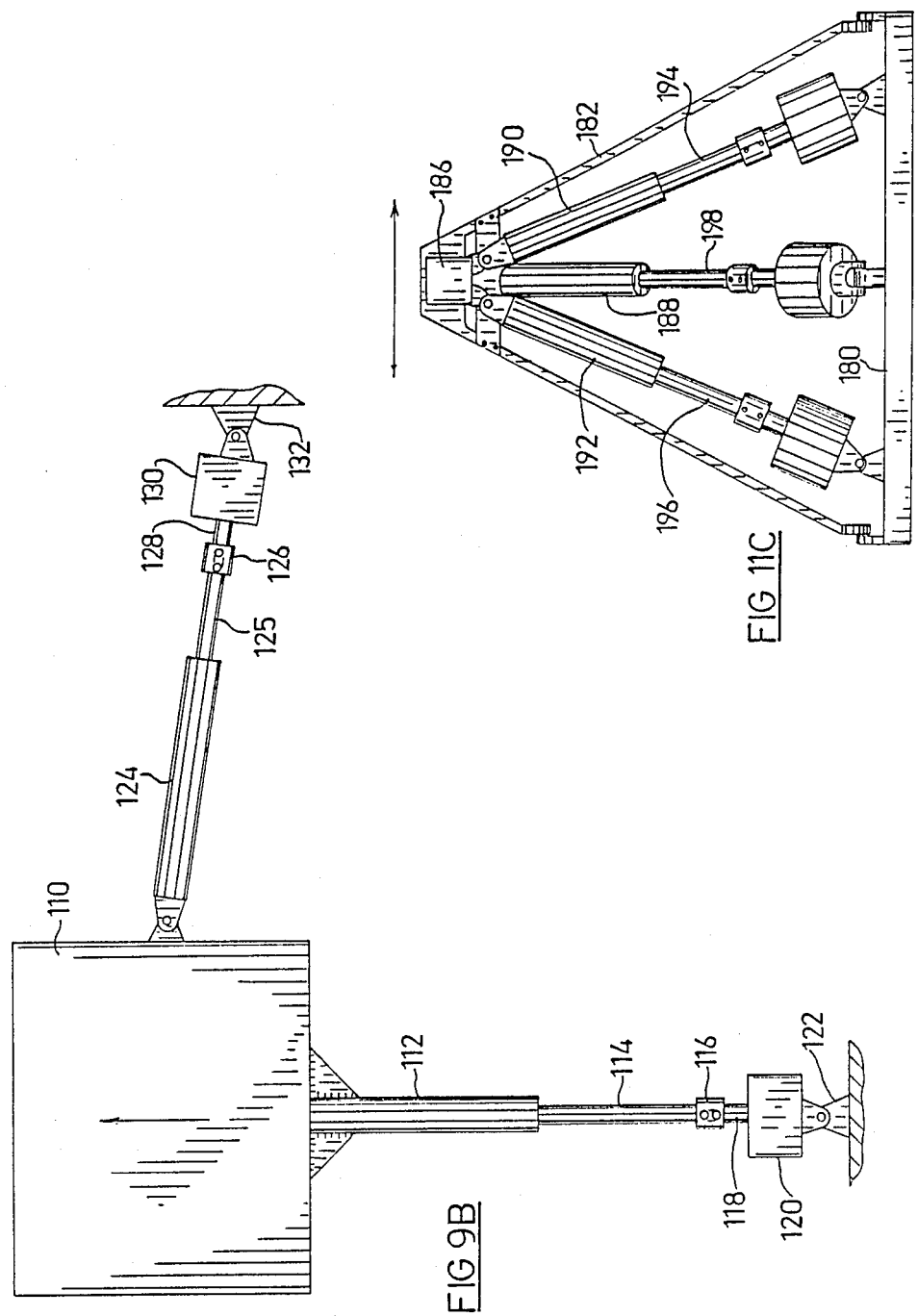

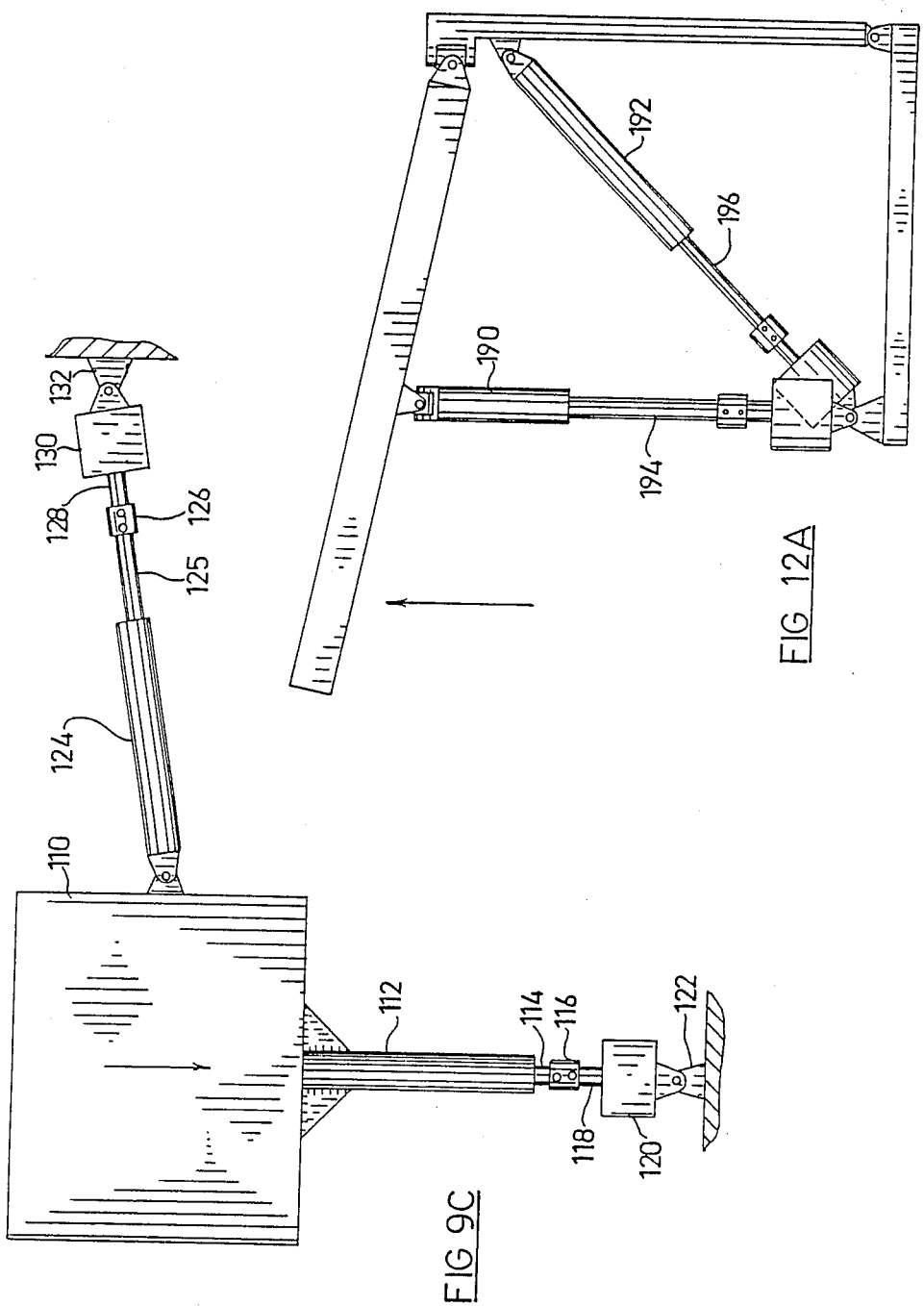

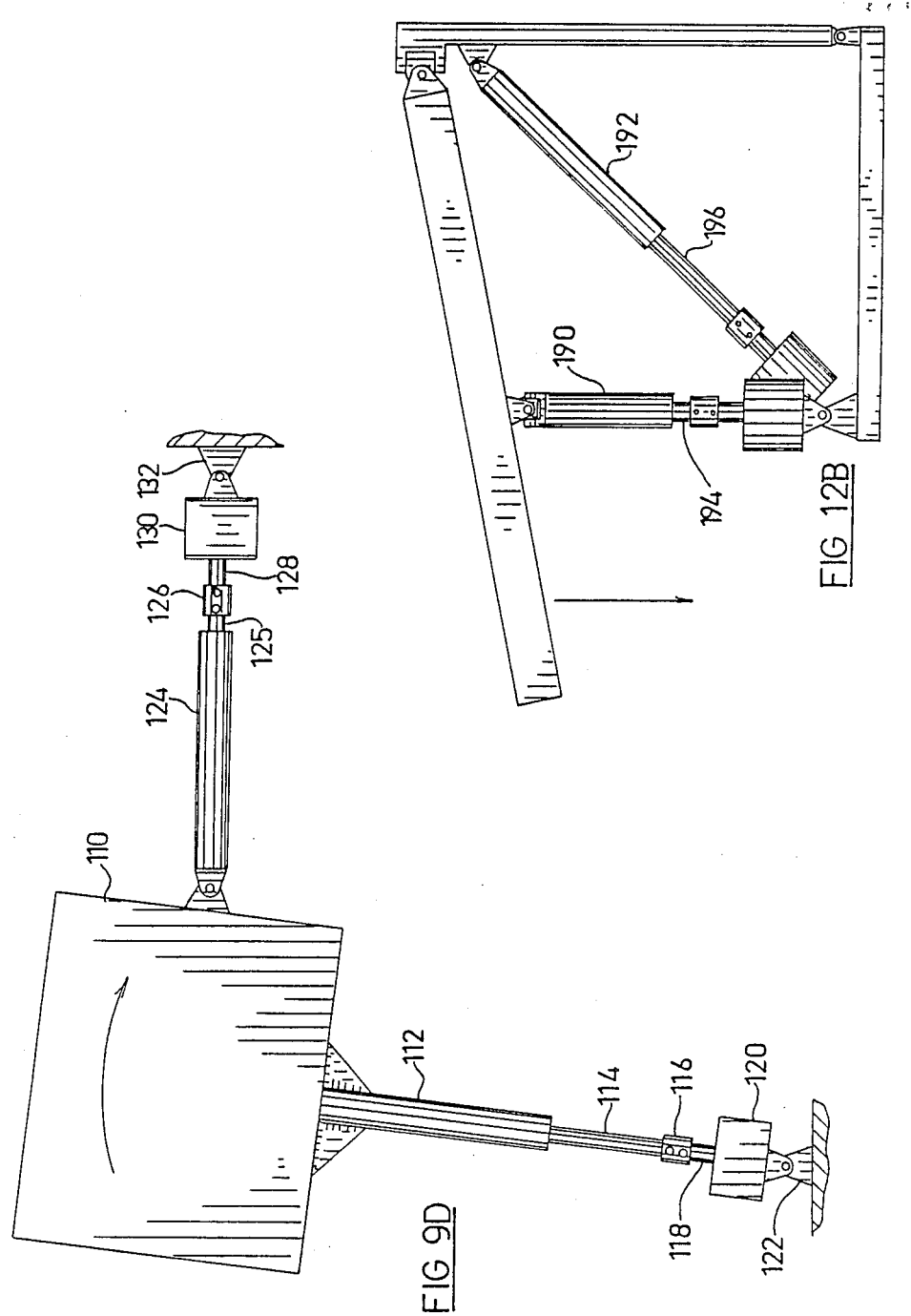

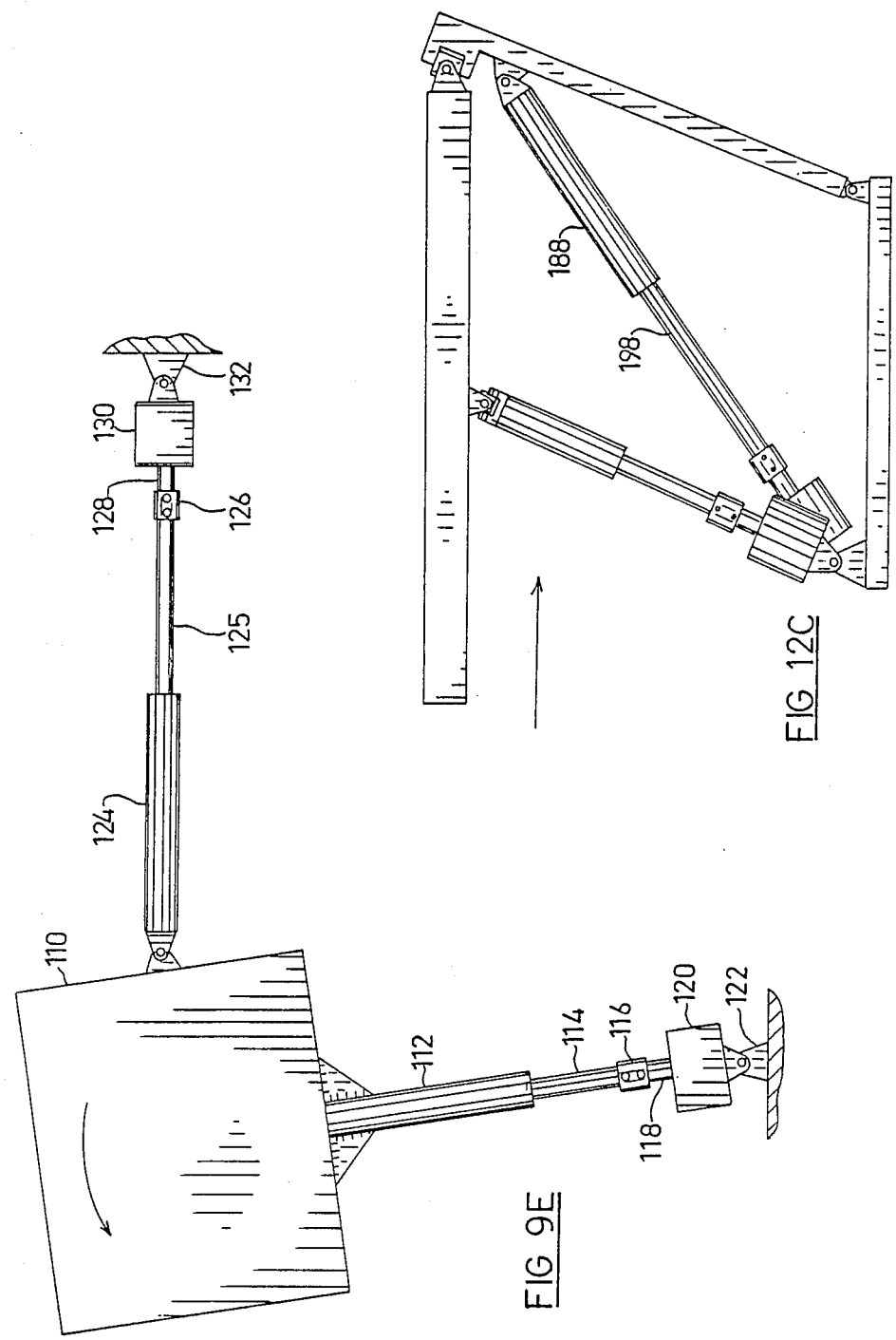

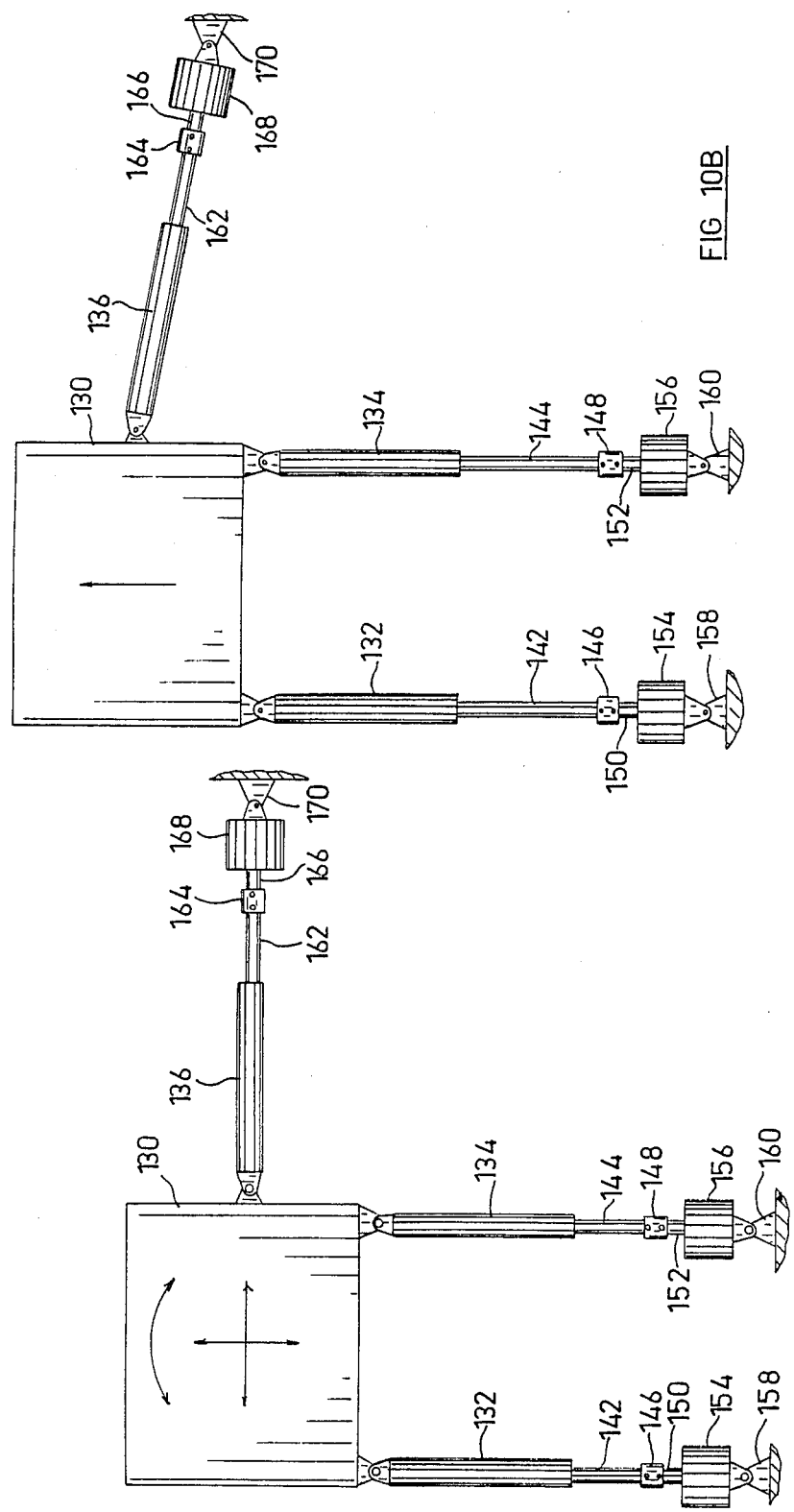

ELECTRIC POSITIONING APPARATUS

FIELD OF THE INVENTION

The present invention relates to mechanical devices generally and more specifically to positioning apparatus including electrically actuable pistons and two and three-dimensional positioners.

BACKGROUND OF THE INVENTION

Various types of positioning apparatus are known on the market. Specifically, electrically actuable cylinders are known. One typical device of this type is a Model 15D manufactured by Industrial Devices Corporation of Novato, California, U.S.A.. This electric cylinder includes fixed outer housing, a fixed screw thread rotatably mounted in the housing and a translatable riding member which translates axially in response to rotation of the screw thread. A piston extension member is mounted for movement together with the translatable riding member.

The above-described device is lubricated with grease, and cannot, as a matter of practicality, be filled with oil because too many seals would be required and no provision was made for accomodating the change in interior volume due to differing displacements of the piston.

Electrically acutuable cylinders of the type described hereinabove are relatively expensive due to their complexity. Due to the fact that they are lubricated with grease, having relatively poor heat distribution characteristics as compared with oil, their mechanical efficiency and operating lifetime are relatively low.

X-Y tables of various designs are also known and typically comprise a plurality of screw drives arranged along perpendicular axes. Due to the requirement for independent X, Y motion, part of the drives, including their power sources, are required to move. As a result, X-Y tables are generally complex and expensive.

Robots of various designs are known. Typically, prior art robots comprise extensible members which are arranged for selectable extension along relatively perpendicular axes.

SUMMARY OF THE INVENTION

The present invention seeks to provide an electrically actuable cylinder which overcomes the above-described disadvantages of the prior art cylinders.

There is thus provided in accordance with a preferred embodiment of the present invention an electrically actuable cylinder comprising a first element defining a cylinder housing and defining an interior generally cylindrical screw threading, a second element defining an interior member and located within the cylinder housing and defining an exterior generally cylindrical screw threading which cooperates with the interior generally cylindrical screw threading of the first element, whereby relative rotation of the first and second elements in a first rotation direction produces translation of the second element relative to the first element in a first axial direction, and relative rotation of the first and second elements in a second, opposite, rotation direction, produces translation of the second element relative to the first element in a second axial direction, opposite to the first axial direction.

Additionally in accordance with an embodiment of the present invention, the first and second elements are each provided with mounting elements for secure attachment thereof to driving or driven elements.

Further in accordance with an embodiment of the present invention, the interior of the first element is filled with lubricating fluid.

Additionally in accordance with a preferred embodiment of the invention, a lubricating fluid reservoir is provided in communication with the interior of the first element and is sealed from the exterior thereof.

Further in accordance with an embodiment of the present invention, the lubricating fluid reservoir communicates with the interior of the first element through a plurality of apertures formed along the length thereof.

Additionally in accordance with an embodiment of the present invention, the lubricating fluid reservoir includes a resiliently flexible portion for adapting to the varying interior volume of the first element as a function of the relative location of the second element therein.

Further in accordance with an embodiment of the invention, the electrically actuable cylinder includes means operative to reduce backlash. In one such embodiment, the second element comprises at least first and second threaded elements flexibly joined.

Additionally in accordance with a preferred embodiment of the present invention, the first and second elements are axially tensioned.

Further in accordance with an embodiment of the present invention there is provided positioning apparatus comprising an element to be positioned, and first and second axially elongatable elements mounted onto the element to be postioned at first and second locations thereat and to support locations, at least one of the first and second axially elongatable elements being pivotably mounted onto the element to be positioned and at least one of the first and second axially elongatable elements being pivotably mounted onto a support location.

Additionally in accordance with an embodiment of the present invention, at least three axially elongatable elements are employed.

Further in accordance with an embodiment of the present invention there is provided a three-dimensional positioning device comprising a base, a first element pivotably mounted with respect to the base for pivotable positioning relative to the base about a first pivot axis, a second element pivotably mounted with respect to the first element for pivotable positioning relative thereto about a second pivot axis perpendicular to the first pivot axis, first axially elongatable means mounted onto the base and either of the first and second elements for selectable positioning of the second element about the first pivot axis and second axially elongatable means mounted onto the base and the second element for selectable positioning of the second element with respect to both the first and second pivot axes.

In accordance with a preferred embodiment of the present invention, the second axially elongatable means comprises two axially elongatable elements arranged in a plane typically parallel to the first pivot axis and having elongation axes which are angled with respect to each other. In accordance with a preferred embodiment of the invention, the two axially elongatable elements operate in a differential mode of operation.

In accordance with an embodiment of the invention, at least some of the base, first element, second element, first axially elongatable means and second axially elongatable means are pivotably interconnected by universal joints.

BRIEF DESCRIPTION OF THE DRAWINGS

The present invention will be understood and appreciated more fully from the following detailed description taken in conjunction with the drawings in which:

FIG. 3 is a side sectional illustration of an electrically actuable cylinder constructed and operative in accordance with a preferred embodiment of the present invention;

FIG. 4 is a sectional illustration of the cylinder of FIG. 3, taken along the lines IV—IV of FIG. 3;

FIG. 8 is an illustration of a cylinder of the type illustrated in FIGS. 1-4 in a typical operating orientation;

FIGS. 9A, 9B, 9C, 9D and 9E are top view illustrations of an X-Y table constructed and operative in accordance with one preferred embodiment of the invention in various operative orientations;

FIGS. 10A, 10B, 10C, 10D, 10E, 10F and 10G are top view illustrations of an X-Y table constructed and operative in accordance with another preferred embodiment of the invention in various operative orientations;

FIGS. 11A, 11B and 11C are respective pictorial, side and end view illustrations of a robot constructed and operative in accordance with a preferred embodiment of the present invention;

FIGS. 12A, 12B, 12C and 12D are side view illustrations of the robot of FIGS. 11A-11C in four alternative operative orientations.

DETAILED DESCRIPTION OF THE PREFERRED EMBODIMENTS

Figure 1A:
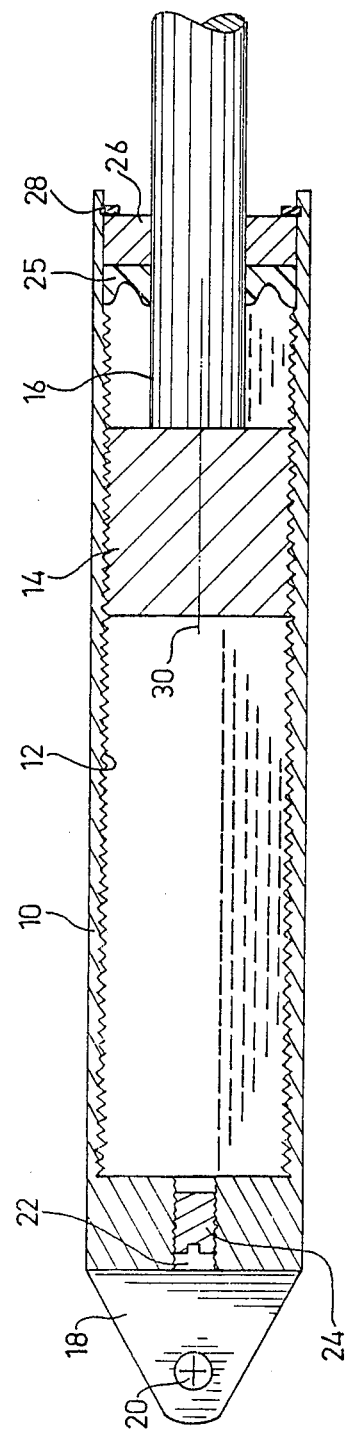
FIGS. 1A and 1B are side sectional illustrations of an electrically actuable cylinder constructed and operative in accordance with an embodiment of the present invention in respective extended and retracted orientations.
Figure 1B:
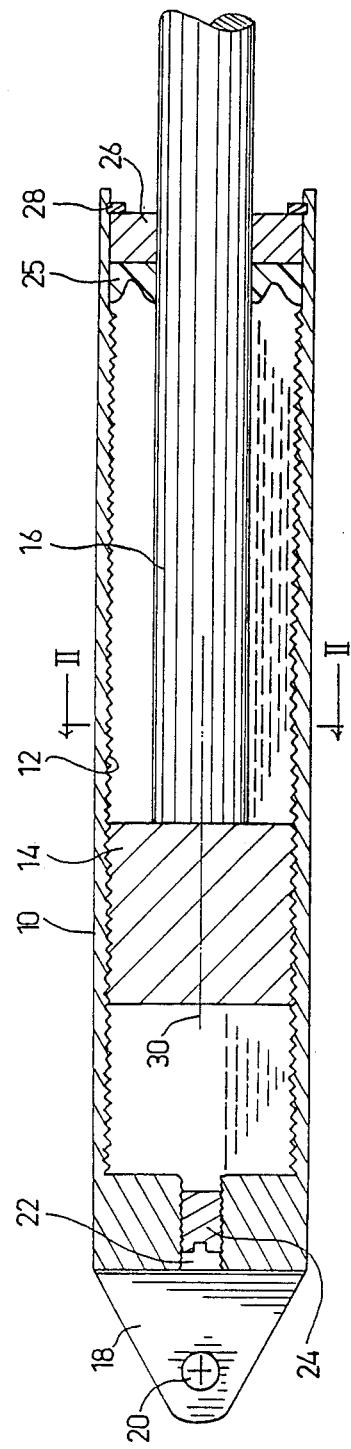

Reference is now made to FIGS. 1A and 1B which illustrate an electrically actuable cylinder constructed and operative in accordance with an embodiment of the present invention and suitable for horizontal disposition. The cylinder comprises a cylinder housing 10 having inwardly facing screw threading 12, an externally threaded piston mounting member 14 and a piston 16, mounted onto mounting member 14.

The cylinder housing 10 is preferably formed with a mounting portion 18 including a mounting aperture 20, for fixed mounting thereof, in a manner which will be described hereinafter in connection with FIG. 8. The cylinder housing 10 is also formed with a lubrication inlet and outlet aperture 22, communicating with the interior of the cylinder housing 10 and having an associated plug 24. Disposed interior of the cylinder housing is a liquid lubricant, typically oil.

At the opposite end of the cylinder housing from aperture 22 there is provided a piston seal 25 and bushing 26, typically held in place by a sealing ring 28, all of conventional construction.

A comparison of FIGS. 1A and 1B illustrates the relative displacement of the mounting member 14 and piston 16 axially along the longitudinal axis 30 of the cylinder. It will be appreciated that relative rotation of the piston mounting member 14 and of cylinder housing 10 in a first rotational direction produces axial displacement of the piston relative to the housing in a first axial direction along axis 30, while relative rotation of the piston mounting member 14 and the cylinder housing 10 in an opposite rotational direction produces axial displacement in an opposite direction.

Figure 2C:
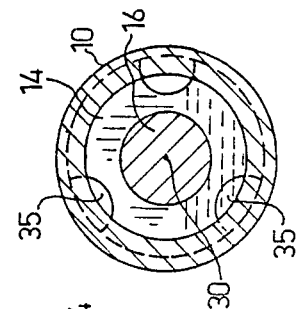
FIGS. 2A, 2B and 2C are sectional illustrations of three embodiment of the cylinder of FIGS. 1A and 1B, taken along the lines II—II of FIG. 1B.
Figure 2B:
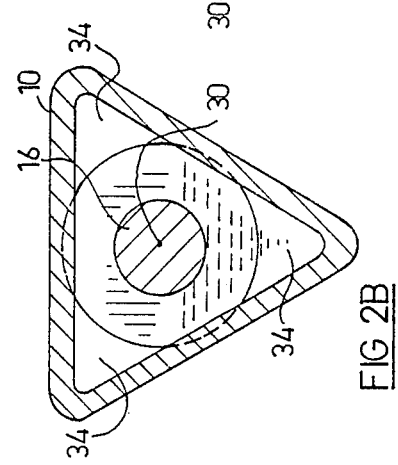
Figure 2A:
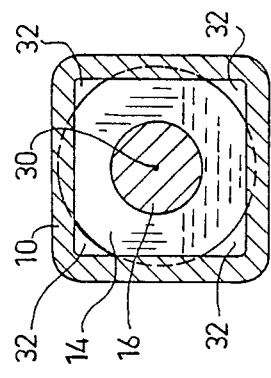

Considering now FIGS. 2A-2C, it is seen that there are a number of alternatives for the configuration of the cylinder housing 10. Three of these alternatives are illustrated, it being noted that the embodiment of 2A shows a square cross section, in which four corner spaces 32 are left between the piston mounting member 14 and the housing to permit oil to pass therethrough as the mounting member 14 moves axially along axis 30.

FIG. 2B shows a triangular configuration of housing 10 providing three corner spaces 34. FIG. 2C shows a generally rounded configuration having a mounting member 14 having a plurality of axial slots 35 formed therein to permit passage therethrough of lubricating fluid, such as oil.

Reference is now made to FIGS. 3 and 4 which illustrate an alternative embodiment of an electrically actuable cylinder constructed and operative in accordance with a preferred embodiment of the present invention. Similarly to the embodiment of FIGS. 1A and 1B, the cylinder comprises a cylinder housing 40 having inwardly facing screw threading 42, an externally threaded piston mounting member 44 and a piston 46, mounted onto mounting member 44.

The cylinder housing 40 is preferably formed with a mounting portion 48 including a mounting aperture 50, for fixed mounting thereof, in a manner which will be described hereinafter in connection with FIG. 8. The cylinder housing 40 is also formed with a lubrication inlet and outlet aperture 52, communicating with the interior of the cylinder housing 40 and having an associated plug 54. Filling the interior of the cylinder housing is a liquid lubricant, typically oil.

At the opposite end of the cylinder housing from aperture 52 there is provided a piston seal 55 and bushing 56, typically held in place by a sealing ring 58, all of conventional construction.

In contrast to the embodiment of FIGS. 1A and 1B, the embodiment of FIGS. 3 and 4 is characterized in that it is provided with means for accomodating excess oil which is expelled from the interior of the cylinder housing 40, when the piston 46 is retracted, thereinto, thereby reducing the interior volume. Accordingly, the embodiment of FIGS. 3 and 4 may be used at any desired orientation, not necessarily horizontal.

The means for accomodating excess oil typically comprises a bladder 60 formed of a resilient material, such as rubber, which surrounds the cylinder housing 40 and is fixedly attached thereto at the extreme ends thereof 62 and 64.

The interior of the bladder 60 typically communicates with the interior of the cylinder housing 40 via a series of apertures 66 formed along the length of the cylinder housing 40. The bladder 40 is enclosed by a relatively rigid cover member 68. It is a particular feature of the invention that adjacent to the rear portion of the cylinder housing 40, i.e. near plug 54, no apertures 66 are defined. Thus, when the mounting member 44 is fully retracted, it does not tend to get stuck in the retracted orientation, due to a deposit of compressed lubricating oil disposed between the mounting member 44 and the rear wall 69 of the cylinder. Another advantage of this construction is to cushion impacts at the extreme positions of the mounting member 44.

Similarly to the operation of the apparatus of FIGS. 1A and 1B, relative displacement of the mounting member 44 and piston 46 axially along the longitudinal axis 70 of the cylinder is produced by relative rotation of the piston mounting member 44 and of cylinder housing 40.

It has been appreciated that problems of backlash sometimes occur in electrically actuable cylinders of the type considered herein. In order to overcome this problem, a special construction is provided in accordance with the present invention, and illustrated in FIGS. 5A and 5B whereby a piston mounting member 74 (which may be substituted for members 14 and 44) is formed to define a flexible mounting for a corresponding piston 76 (which may be substituted for members 16 and 46).

Figure 5B:
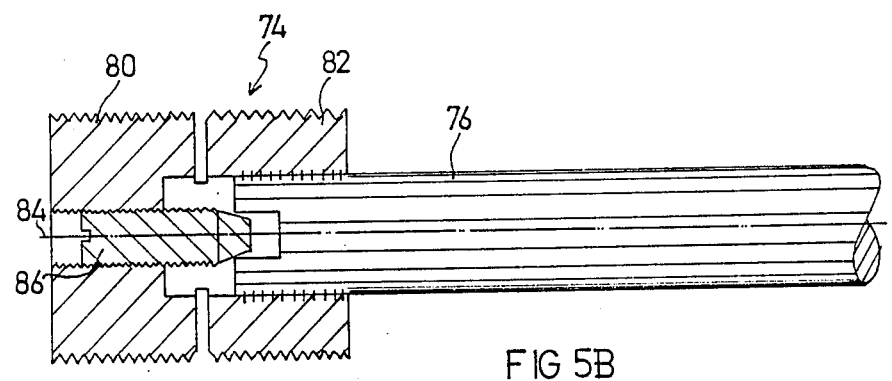
FIGS. 5A and 5B are respective side and side sectional illustrations of an anti-backlash type of interconnection preferably employed in the cylinder of FIGS. 1-4.
Figure 5A:
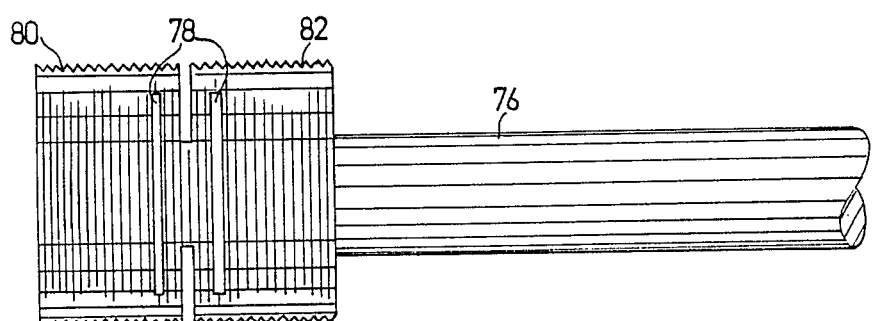

In the illustrated embodiment of FIGS. 5A and 5B, a piston mounting member 74 is formed with transverse slots 78 which effectively define two portions 80 and 82 thereof, which are somewhat flexible with respect to each other along axis 84 but rigid with respect to torsional displacement relative thereto. The piston 76 is fixedly mounted onto portion 82 and an arrangement is provided whereby portions 80 and 82 are tensioned with respect to each other along longitudinal axis 84, as by a tensioning screw 86 forcing portions 80 and 82 apart.

Reference is now made to FIG. 8, which illustrates the environment in which the cylinders of FIGS. 1–7 operate. Here such a cylinder 90 is shown having the cylinder housing 92 pivotably but not rotatably mounted onto a movable element 94. The piston 96 is mounted, typically via a rigid coupling 98 to the spindle 99 of an electric motor 100, whose base is pivotably, but not rotatably mounted onto a fixed mounting support 102. Rotation of the piston 96 about its longitudinal axis 104 in either direction provides either extension or retraction of the piston 96 relative to housing 92, thus providing displacement of member 94 along arrows 106.

Figure 6:
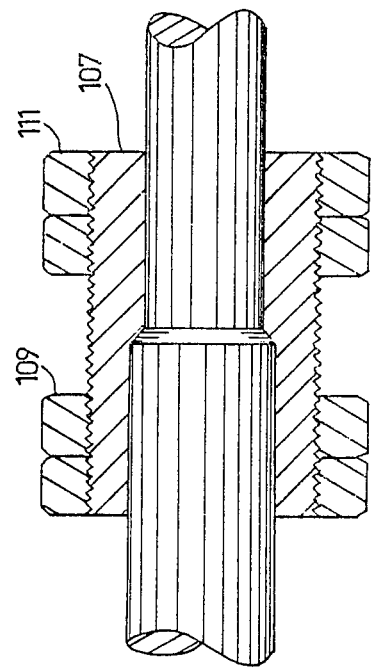
FIG. 6 is a sectional illustration of a rigid coupling useful in various embodiments of the present invention.
Figure 7:
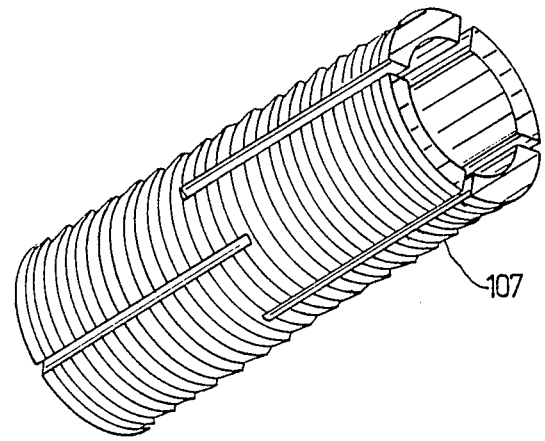
FIG. 7 is a pictorial illustration of a slotted threaded collar member useful in the embodiment of FIG. 6.

Rigid coupling 98 is illustrated in FIGS. 6 and 7 which comprises a threaded axially slotted sleeve 107 which is arranged to overlie two shafts, which may be of different diameters and to be tightened thereover by corresponding pairs of nuts 109 and 111. Each nut of a pair of nuts is forcibly tightened against the other nut of the pair to provide axial tension on the sleeve thereunder, forcing the sleeve 107 radially inwardly.

Reference is now made to FIGS. 9A–9E, which illustrate an X-Y table constructed and operative in accordance with a preferred embodiment of the present invention. According to a preferred embodiment of the invention, the X - Y table comprises a table member 110 arranged for motion in an X - Y plane and having fixed thereto a first electrically actuable cylinder 112. Cylinder 112 is preferably a cylinder of the type described hereinabove in connection with FIGS. 1–8 but may alternatively be a prior art cylinder or any other suitable cylinder.

A piston 114 of cylinder 112 is mounted, typically via a coupling 116, typically of the type shown in FIGS. 6 and 7, to the spindle 118 of an electric motor 120, whose base is pivotably, but not rotatably, mounted onto a fixed mounting support 122.

Pivotably mounted onto table member 110 about a pivot axis perpendicular to the X - Y plane and extending generally perpendicular to cylinder 112 is an electrically actuable cylinder 124. Cylinder 124 is preferably a cylinder of the type described hereinabove in connection with FIGS. 1–8 but may alternatively be a prior art cylinder or any other suitable cylinder.

A piston 125 of cylinder 124 is mounted, typically via a coupling 126, typically of the type shown in FIGS. 6 and 7, onto the spindle 128 of an electric motor 130, whose base is pivotably, but not rotatably, mounted onto a fixed mounting support 132.

FIG. 9A shows the table member 110 in a nominal intermediate position, with both pistons 114 and 125 partially retracted. FIG. 9B shows the orientation when piston 114 is fully extended; FIG. 9C shows the orientation when piston 114 is fully retracted; FIG. 9D shows the orientation when piston 125 is fully retracted; and FIG. 9E shows the orientation when piston 125 is fully extended.

It is appreciated that when table member 110 is out of its nominal position, it is skewed in the X - Y plane. For applications wherein the rotational orientation of the table member 110 is of significance, an alternative construction of an X - Y table is provided, as illustrated in FIGS. 10A–10G.

According to a preferred embodiment of the invention, the X - Y table of FIGS. 10A–10G comprises a table member 130 arranged for motion in an X - Y plane and having pivotably mounted thereto about pivot axes lying perpendicular to the X - Y plane three electrically actuable cylinders 132, 134 and 136, each preferably a cylinder of the type described hereinabove in connection with FIGS. 1–8 but alternatively a prior art cylinder or any other suitable cylinder.

Cylinders 132 and 134 are arranged in generally parallel orientation to a first side of table member 130, while cylinder 136 is arranged generally perpendicularly to cylinders 132 and 134 to a second side of table member 130, separated from the first side by 90 degrees.

Pistons 142 and 144 of respective cylinders 132 and 134 are each mounted via respective couplings 146 and 148, typically of the type shown in FIGS. 6 and 7, to spindles 150 and 152 or respective electric motors 154 and 156, whose bases are pivotably, but not rotatably, mounted onto fixed mounting supports 158 and 160.

A piston 162 of cylinder 136 is mounted, typically via a coupling 164, typically of the type shown in FIGS. 6 and 7, to the spindle 166 of an electric motor 168, whose base is pivotably, but not rotatably, mounted onto a fixed mounting support 170.

Figure 10C:
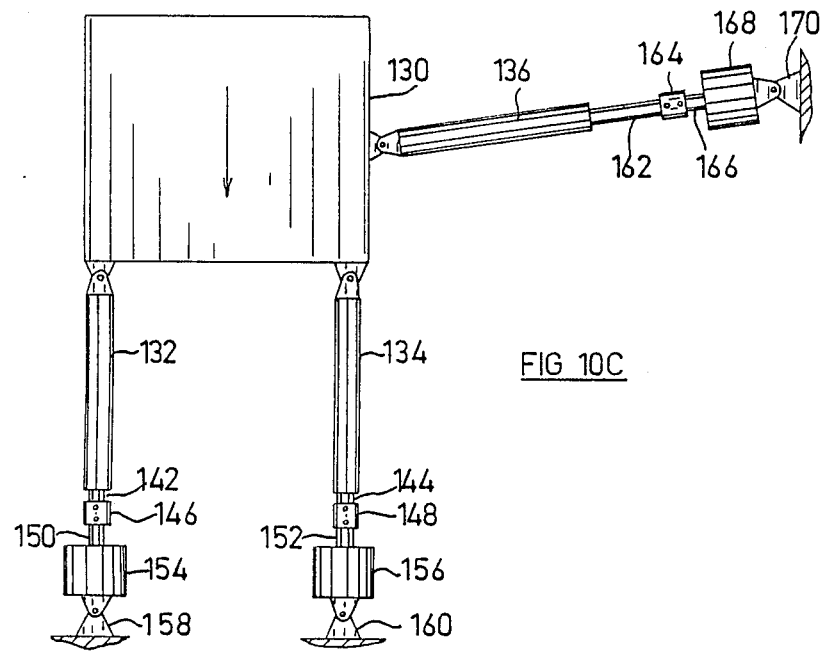
Figure 10D:
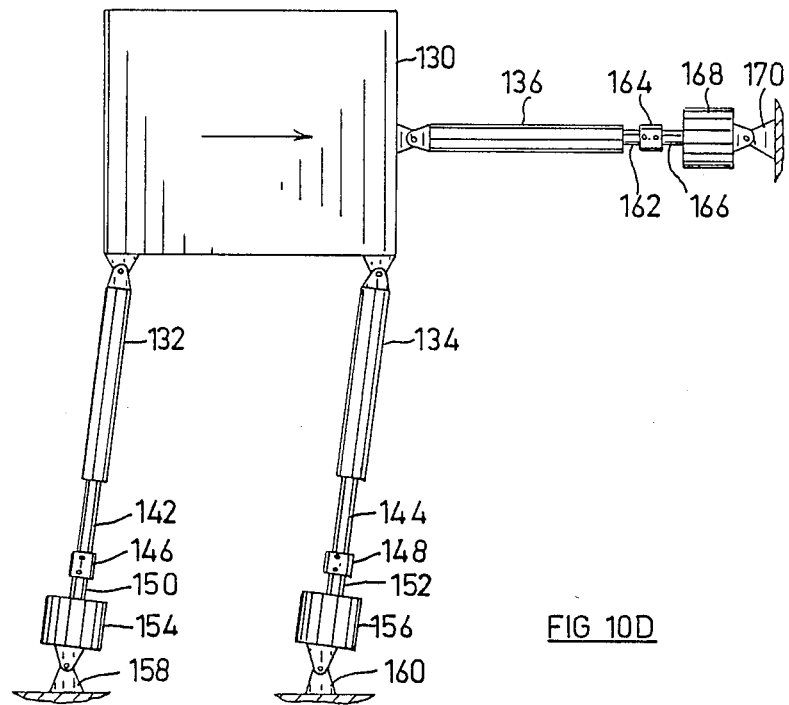
Figure 10E:
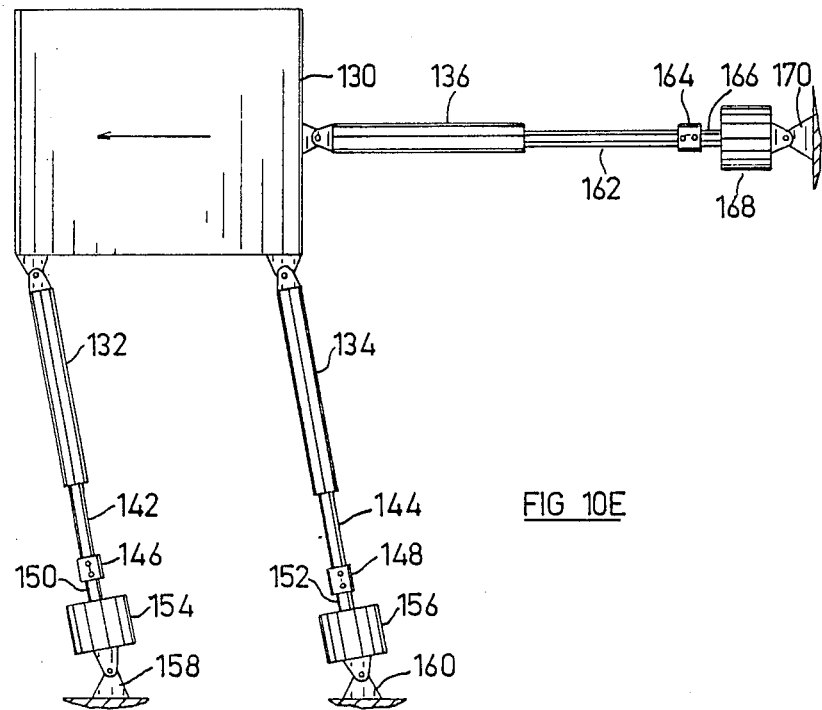
Figure 10F:
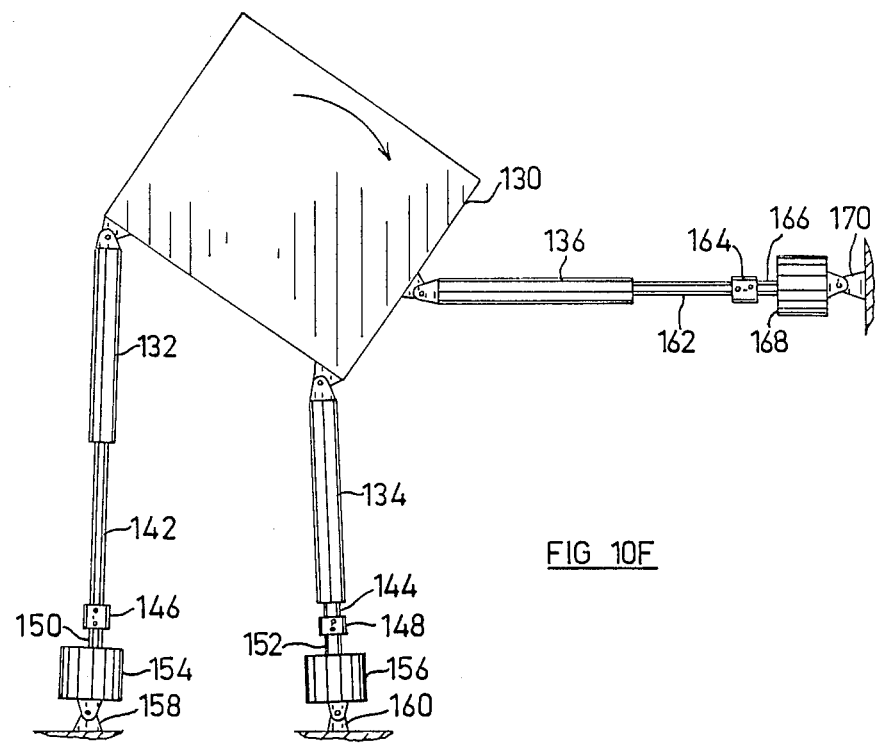
Figure 10G:
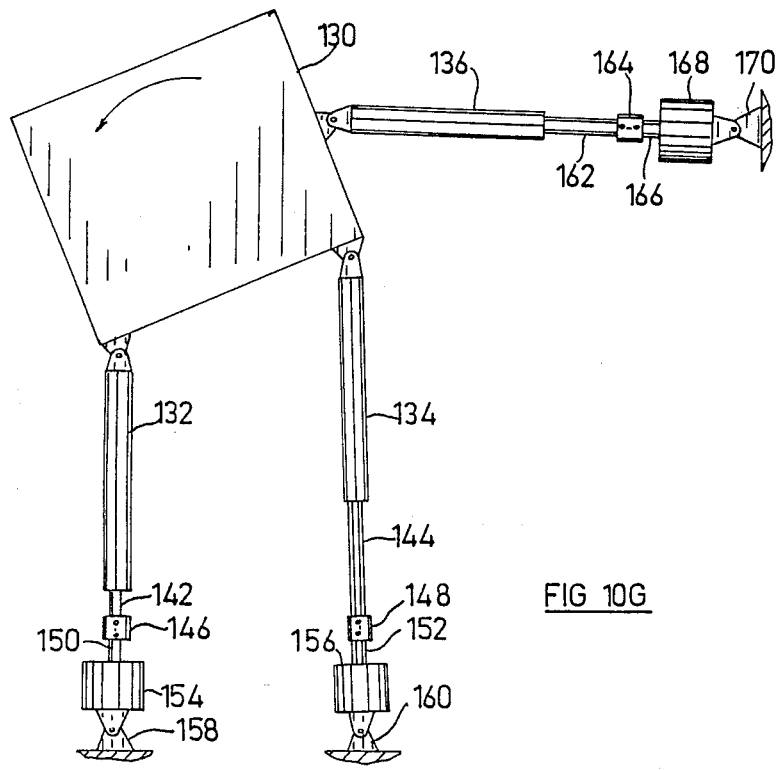

FIG. 10A shows the table member 130 in a nominal intermediate position, with pistons 142, 144 and 162 partially retracted. FIG. 10B shows the orientation when pistons 142 and 144 are fully extended; FIG. 10C shows the orientation when pistons 142 and 144 are fully retracted; FIG. 10D shows the orientation when piston 162 is fully retracted; FIG. 10E shows the orientation when piston 162 is fully extended; FIG. 10F shows rotation of the table member 130 about its nominal position of FIG. 10A in a first direction and FIG. 10G shows rotation of the table member 130 about its nominal position of FIG. 10B in an opposite direction.

Figure 11A:
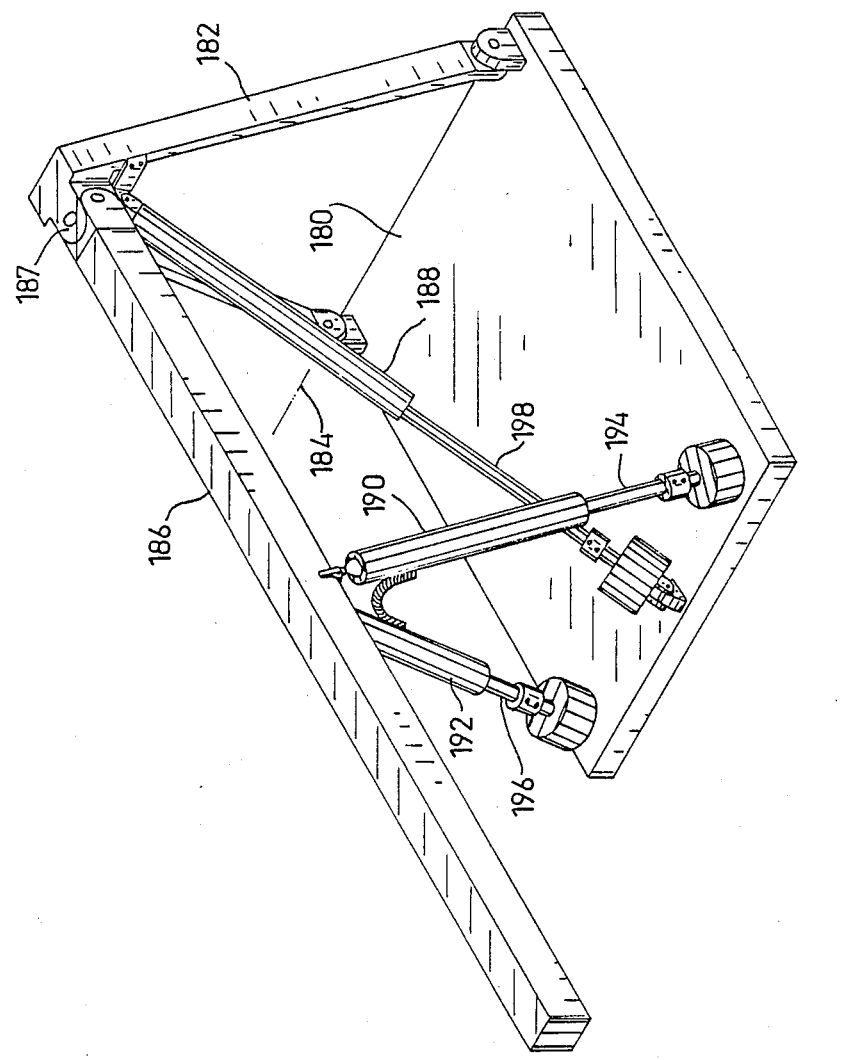

Reference is now made to FIGS. 11A-11C which illustrate three-dimensional positioning apparatus constructed and operative in accordance with a preferred embodiment of the invention and comprising a base 180 and a first element 182, typically in the form of a sawhorse bracket, pivotably mounted with respect to the base 180 for pivotable positioning relative to the base about a first pivot axis 184, typically lying parallel to the plane of the base 180.

A second element 186, typically in the form of a beam, is pivotably mounted with respect to the first element 182, preferably by a universal joint 187, which permits rotation of the second element 186 about the first pivot axis and also with respect to a second pivot axis perpendicular to the first pivot axis.

First axially elongatable means 188, typically in the form of an electrically actuable cylinder of the type described above and illustrated in FIGS. 1-8, but alternatively any suitable elongatable means, is mounted onto the base 180 and the first element 182 for selectable positioning of the first element about the first pivot axis, in much the same arrangement illustrated in FIG. 8 hereinabove.

Second axially elongatable means, typically in the form of a pair of electrically actuable cylinders 190 and 192, are mounted onto the base 180 and onto the second element 186 for selectable positioning of the second element with respect to both the first and second pivot axes. It is noted that each of the electrically actuable cylinders is provided with a driving and coupling assembly of the type shown in FIG. 8. It is appreciated that the cylinders 190 and 192 may operate in phase or out of phase, thus providing an additional degree of freedom. Thus both up and down motion and right to left motion may be provided thereby.

According to an altervative embodiment of the invention, cylinder 188 may be coupled directly to element 186 instead of being coupled to element 182. In such alternative embodiment, the three cylinders 188, 190 and 192 may all be joined to element 186 at the same general location.

FIGS. 11A-11C illustrate the positioning apparatus in a nominal position with all of the pistons in intermediate positions. FIG. 12A illustrates the positioning apparatus in a raised position, wherein pistons 194 and 196 of respective cylinders 190 and 192 are fully extended. FIG. 12B illustrates the positioning apparatus in a lowered position, wherein piston 194 of respective cylinder 190 is fully retracted.

Figure 12D:
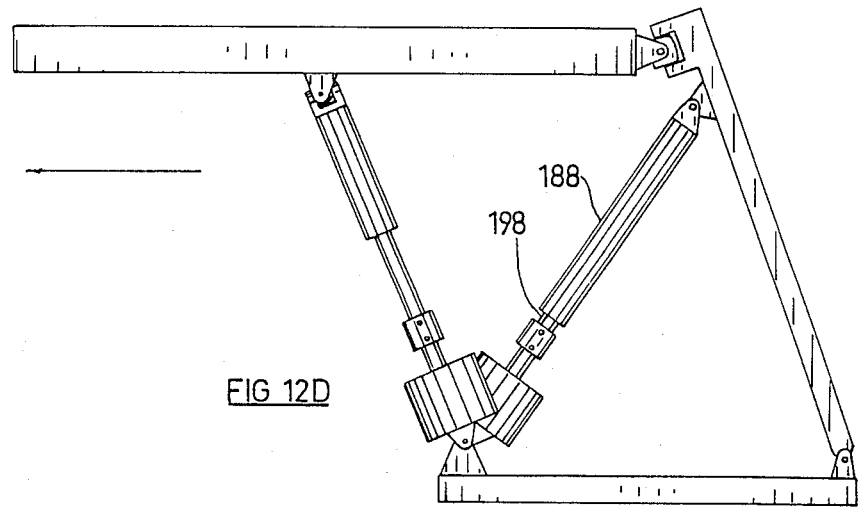

FIG. 12C illustrates the position apparatus in a backward position, wherein piston 198 of cylinder 188 is fully extended, and FIG. 12D illustrates the positioning apparatus in a forward position, wherein piston 198 of cylinder 188 is fully retracted.

Figure 13A:
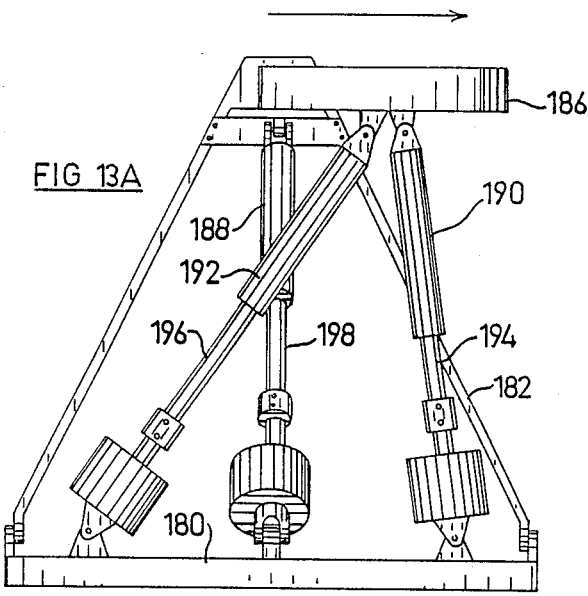
FIGS. 13A and 13B are end view illustrations of the robot of FIGS. 11A-11C in two alterative operative orientations.
Figure 13B:
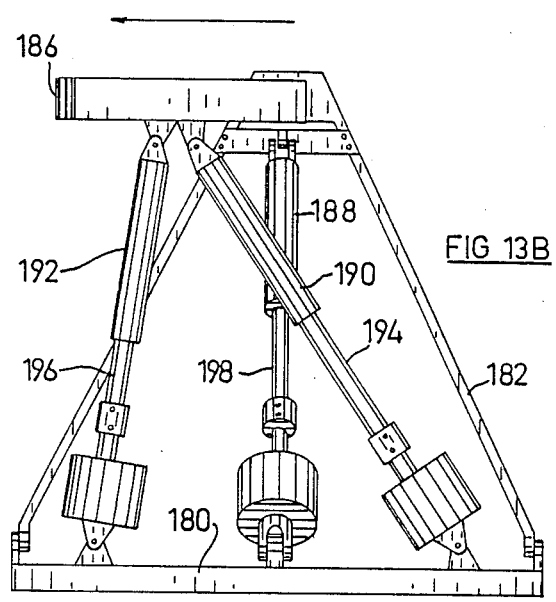

FIG. 13A illustrates the positioning apparatus in a left-sided orientation wherein piston 196 is extended more than piston 194 while FIG. 13B illustrates the positioning apparatus in a right-sided orientation wherein piston 94 is extended more than piston 196.

It will be appreciated by persons skilled in the art that the examples provided above are merely illustrative of the structure and operation of the apparatus of the present invention. The present invention is not defined by what is described hereinabove but rather the scope of the invention is limited only by the claims which follow:

I claim:

1. Positioning apparatus comprising:
a base,
a non-elongatable first element pivotably mounted onto said base for pivotable positioning relative thereto about a first pivot axis only;
a second element pivotably mounted onto said first element for pivotable positioning relative thereto about two pivot axes one substantially parallel to and one substantially perpendicular to said first pivot axis;
first axially elongatable means mounted pivotably onto said base and pivotably connected to one of said first and second pivotably elements for selectable positioning of said first element about said first pivot axis said first axially elongatable means lying at an angle to a first plane extending through said first element and through said first pivot axis; and
second axially elongatable means mounted pivotably onto said base and said second element at a distance from its pivoting connection with said first element for selectable positioning of said second element with respect to said pivot axis substantially perpendicular to said first pivot axis said second axially elongatable means comprising two axially elongatable elements arranged in a plane generally parallel to said first plane and having elongation axes which are angled with respect to each other and converging towards each other from said base to said second element.

2. Positioning apparatus according to claim 1, in which there is a universal joint between the said first and second elements.

* * * * *